(12) United States Patent
Sampson

(10) Patent No.: US 12,520,838 B2
(45) Date of Patent: Jan. 13, 2026

(54) CAMOUFLAGE APPARATUS AND METHOD OF USE THEREOF

(71) Applicant: Bruce Jason Sampson, Prince Frederick, MD (US)

(72) Inventor: Bruce Jason Sampson, Prince Frederick, MD (US)

( * ) Notice: Subject to any disclaimer, the term of this patent is extended or adjusted under 35 U.S.C. 154(b) by 0 days.

(21) Appl. No.: 18/741,262

(22) Filed: Jun. 12, 2024

(65) Prior Publication Data
US 2024/0407355 A1 Dec. 12, 2024

Related U.S. Application Data

(60) Provisional application No. 63/472,448, filed on Jun. 12, 2023.

(51) Int. Cl.
*A01M 31/02* (2006.01)

(52) U.S. Cl.
CPC .................................. *A01M 31/025* (2013.01)

(58) Field of Classification Search
CPC .................................................... A01M 31/025
USPC .......................................................... 135/901
See application file for complete search history.

(56) References Cited

U.S. PATENT DOCUMENTS

| | | | |
|---|---|---|---|
| 2,792,844 A * | 5/1957 | Clark | A45F 4/04 135/117 |
| 4,224,754 A * | 9/1980 | Derryberry | A01M 31/025 135/117 |
| 4,813,441 A | 3/1989 | Kepley | |
| 4,974,265 A * | 12/1990 | Maggio | A47K 3/325 135/901 |
| 5,037,052 A * | 8/1991 | Crisp | A01M 31/025 248/229.23 |
| 5,214,872 A | 6/1993 | Buyalos, Jr. | |
| 5,528,849 A * | 6/1996 | Plinta | A01M 31/025 135/901 |
| 5,613,512 A | 3/1997 | Bean | |
| 6,306,471 B1 | 10/2001 | Pitman et al. | |
| 7,219,680 B1 * | 5/2007 | Gresock | E04H 15/001 135/96 |
| 7,246,630 B1 * | 7/2007 | Ransom | E04H 15/001 135/117 |
| 8,356,784 B2 | 1/2013 | Doll et al. | |
| 9,458,644 B1 | 10/2016 | Russell | |
| 11,559,043 B2 * | 1/2023 | Lacobelle | A01K 29/00 |
| 11,707,060 B2 * | 7/2023 | Arkenau | E04H 15/001 135/141 |
| 11,785,919 B2 * | 10/2023 | Meeks | A01K 13/001 119/606 |
| 2009/0178326 A1 | 7/2009 | Suter | |

(Continued)

*Primary Examiner* — Christopher D Hutchens
(74) *Attorney, Agent, or Firm* — HSML P.C.

(57) ABSTRACT

A camouflage system includes an artificial tree branch having a flexible fabric cover having an inner surface defining an enclosed space. A coil spring is attached to the fabric cover within the enclosed space. The length of the artificial tree branch is variable by compressing and/or tensioning the coil spring. The artificial tree branch is thus easily compactible for transporting to a hunting location and can be expanded to the size of a natural tree branch on site. The camouflage system may include devices for attaching the artificial tree branch to a tree to hide a tree stand and its occupant from game animals.

18 Claims, 6 Drawing Sheets

(56) References Cited

U.S. PATENT DOCUMENTS

| | | | |
|---|---|---|---|
| 2012/0060881 A1* | 3/2012 | Ly-Cho | E04H 15/405 |
| | | | 135/121 |
| 2014/0209138 A1* | 7/2014 | Thomason | E04H 15/001 |
| | | | 135/117 |
| 2015/0184378 A1* | 7/2015 | Silva | E04H 15/44 |
| | | | 160/351 |
| 2015/0313206 A1 | 11/2015 | Holland | |
| 2017/0215408 A1* | 8/2017 | Swanson | A01M 31/025 |

\* cited by examiner

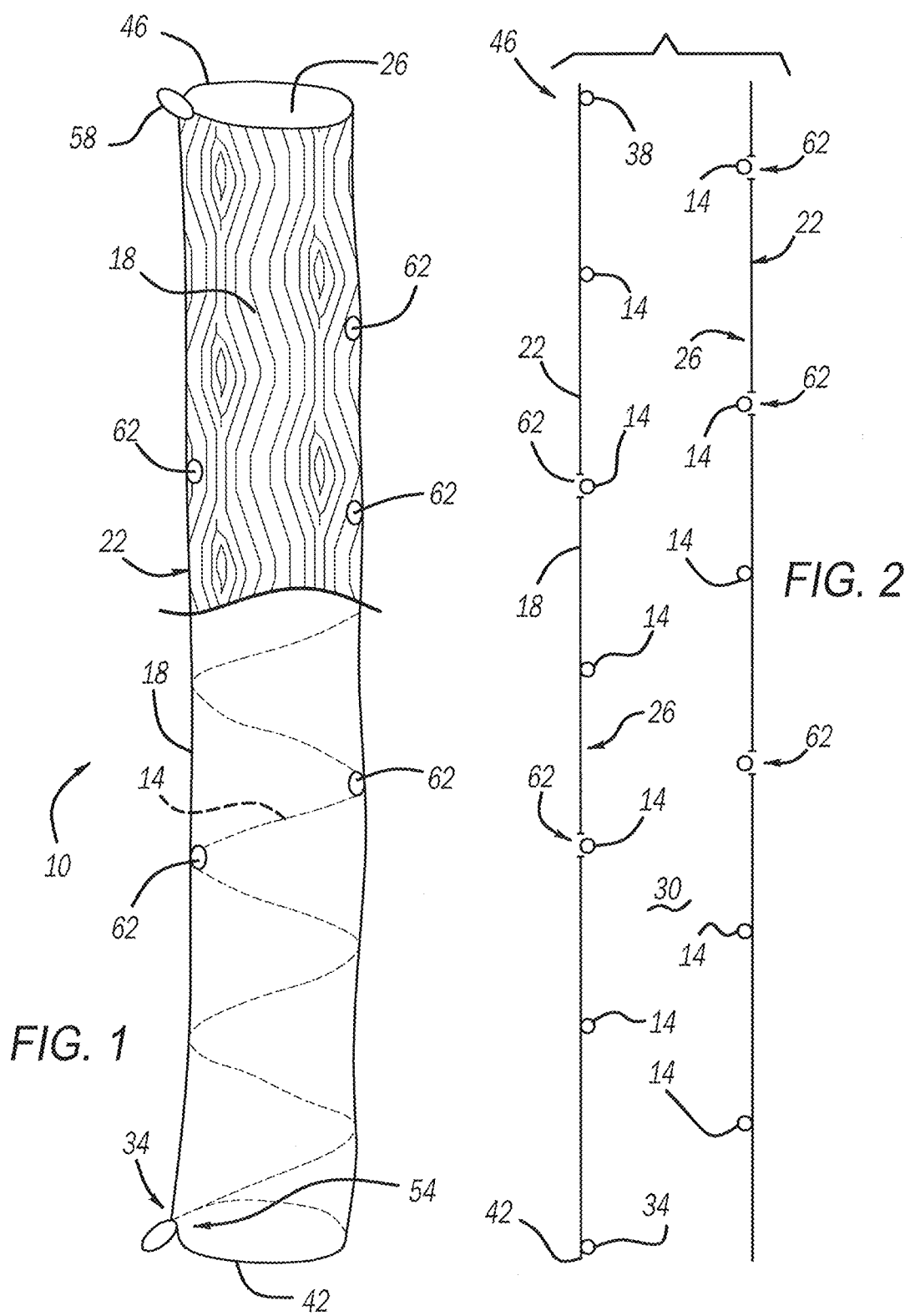

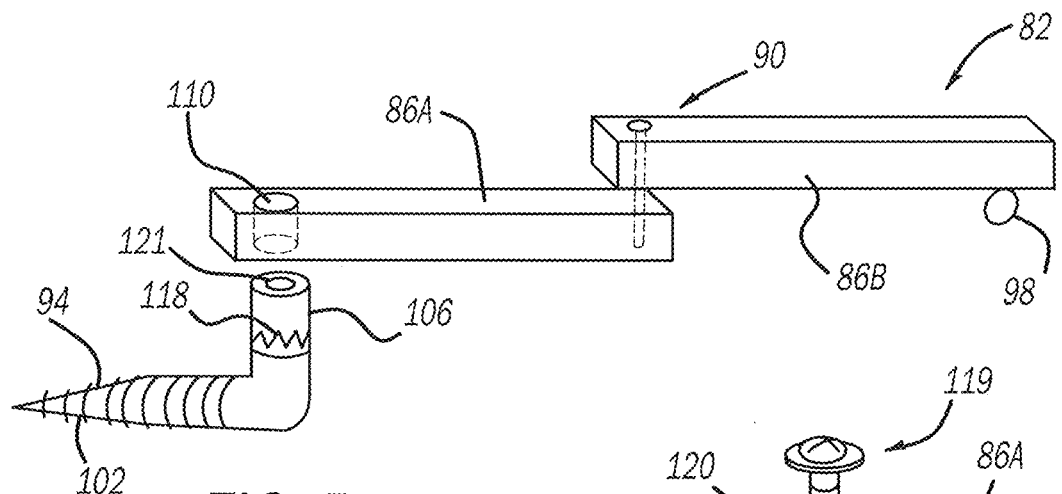
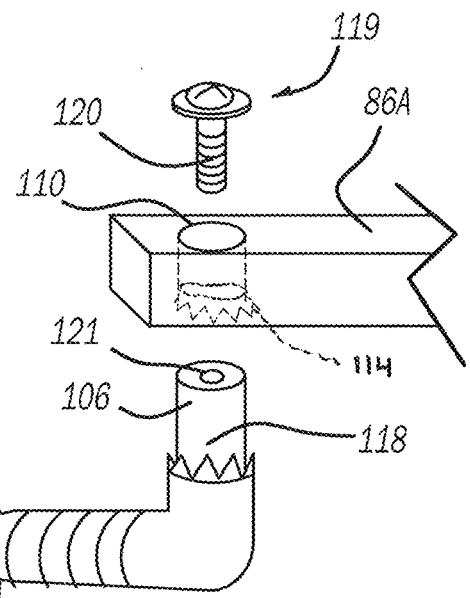
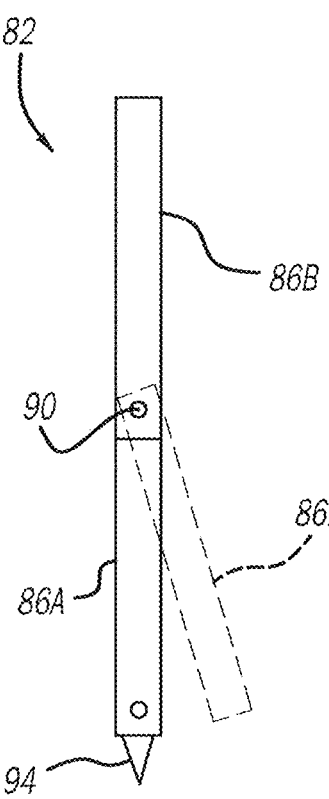
FIG. 5
FIG. 6
FIG. 7

CAMOUFLAGE APPARATUS AND METHOD OF USE THEREOF

CROSS REFERENCE TO RELATED APPLICATION

This application claims the benefit of U.S. Provisional Patent Application No. 63/472,448, filed Jun. 12, 2023, and which is hereby incorporated by reference in its entirety.

TECHNICAL FIELD

This disclosure relates to portable camouflage systems.

BACKGROUND OF THE INVENTION

Hunters sometimes employ camouflage to hide themselves and their equipment from the view of game animals, thereby facilitating the approach of game animals in close proximity to the hunter.

SUMMARY

A camouflage system includes an artificial tree branch having a coil spring and a flexible cover. The flexible cover is configurable into an expanded shape wherein the length, width, and height of the flexible cover is may be maximized. The flexible cover is also foldable or collapsible to reduce or minimize one or more of its dimensions to make it more compact for storage or transportation. The flexible cover may, for example, be cylindrical, conical, or frusto-conical in the expanded shape.

The coil spring is disposed within the flexible cover and attached to the cover such that the coil spring shortens when the cover is collapsed and lengthens when the cover is expanded. The coil spring maintains the generally cylindrical or frustoconical shape of the cover when the cover is expanded.

The artificial tree branch may be attached to a tree to obscure the view of a tree stand and/or a hunter from game animals, thereby providing a lightweight, portable camouflage system. The artificial tree branch provided herein also very closely approximates the appearance of a natural tree branch, which makes it a very effective camouflage system.

The camouflage system may also include attachment elements for attaching the artificial tree branch to a tree in a naturally-appearing manner. A method of using the camouflage system is also provided herein.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic, side view of an artificial tree branch in an expanded shape;

FIG. 2 is a schematic, cross-sectional side view of the artificial tree branch of FIG. 1 in the expanded shape;

FIG. 5 is a schematic, perspective view of an articulating support arm;

FIG. 6 is a schematic, perspective, partially exploded view of the articulating support arm of FIG. 5;

FIG. 7 is a schematic, top view of the articulating support arm of FIG. 5;

DETAILED DESCRIPTION

Figure 3:
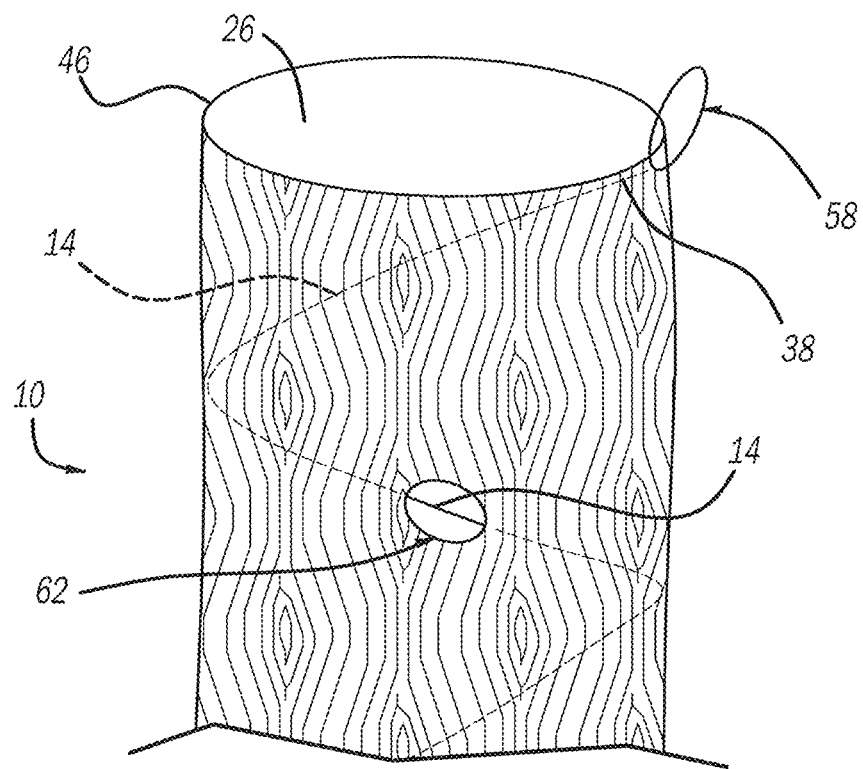
FIG. 3 is a schematic, side view of one end of the artificial tree branch of FIG. 1.

Referring to FIGS. 1-4, wherein like reference numbers refer to like components, an artificial tree branch 10 is schematically depicted. The branch 10 includes a coil spring 14 and a flexible cover 18. The flexible cover 18 in the embodiment depicted is a lightweight fabric, though any material that enables the branch 10 to perform as described herein may be employed within the scope of the claimed invention. The flexible cover 18 is configurable into an expanded shape in which the dimensions of the flexible cover, especially the length, are substantially maximized, as shown in FIGS. 1-3. The flexible cover 18 may, for example, be cylindrical, conical, or frusto-conical in the expanded shape. In the embodiment depicted in FIGS. 1-4, the cover 18 is substantially cylindrical in the expanded shape.

Figure 4:
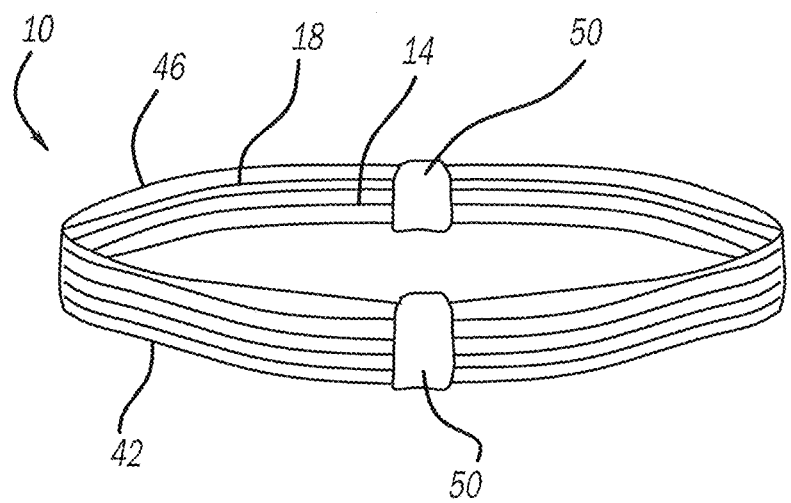
FIG. 4 is a schematic, side view of the artificial tree branch of FIG. 1 in a compressed shape.

The cover 18 has an external surface 22 and an internal surface 26. The internal surface 26 defines an enclosed space 30. The coil spring 14 is disposed within the enclosed space 30 of the flexible cover 18. The coil spring 14 has an unstressed state, as shown in FIGS. 1-3, and a compressed state, as shown in FIG. 4. The coil spring 14 in the unstressed state has a shape that supports and maintains the flexible cover 18 in the expanded shape. Thus, in the embodiment depicted in FIGS. 1-4, the coil spring 14 is a cylindrical helix. In the case of a cover having a conical or frusto-conical expanded shape, the coil spring would be a conical or frusto-conical helix.

The coil spring 14 has a first end 34 and a second end 38. The first end 34 of the spring 14 is connected and attached to one end 42 of the cover 18, and the second end 38 of the spring 14 is connected and attached to the other end 46 of the cover 18. The coil spring 14 may also be attached to the internal surface 26 at various points between the ends 34, 38. Thus, movement of the spring 14 between its expanded, unstressed shape and the compressed shape causes a corresponding change in the shape of the cover 18. More specifically, as the spring 14 is axially compressed from its unstressed state toward its compressed state, the spring 14 draws the ends 42, 46 of the cover 18 together, thereby reducing the length of the cover 18. Similarly, when the spring 14 is released from the compressed state, the stored energy of the spring 14 quickly and automatically draws the ends 42, 46 apart, thereby maximizing the length of the cover 18. Thus, the coil spring 14 is compressible to significantly reduce its length, thereby allowing the flexible cover 18 to fold or collapse for compact storage or transport. The outer diameter of the spring 14 is marginally less than the inner diameter of the cover, and thus the spring 14 acts on the interior surface 26 to maintain the cylindrical (or frusto-conical) shape of the cover 18 in its unstressed, expanded state.

As shown in FIG. 4, fastening elements 50 are employed to maintain the cover 18 and the spring 14, i.e., the branch 10, in the compact configuration and to prevent the spring 14 from expanding to its unstressed shape. In the embodiment depicted, the fastening elements 50 are hook-and-loop straps that wrap around segments of the spring and cover.

The branch 10 includes first and second fastening elements 54, 58, each mounted with respect to the cover 18 at a respective end 42, 46. In the embodiment depicted, the first and second fastening elements 54, 58 are carabiners. The cover 18 also defines a plurality of holes 62. Each hole 62 is positioned such that the spring 14 contacts the internal surface 26 at the edge of the hole 62. Accordingly, a segment of the spring 14 extends across each hole 62. The holes 62 may be stitched around their peripheries or otherwise reinforced to prevent tearing.

As best seen in FIGS. 1 and 3, the exterior surface 22 of the cover 18, and therefore of the artificial branch 10, is printed or otherwise treated to resemble tree bark. It should be noted that, in FIG. 1, only approximately half of the exterior surface 22 is shown with a tree bark pattern so that the spring 14 can be more clearly depicted; however, the entire exterior surface 22, from end 42 to end 46, is characterized by tree bark graphics.

Figure 10:
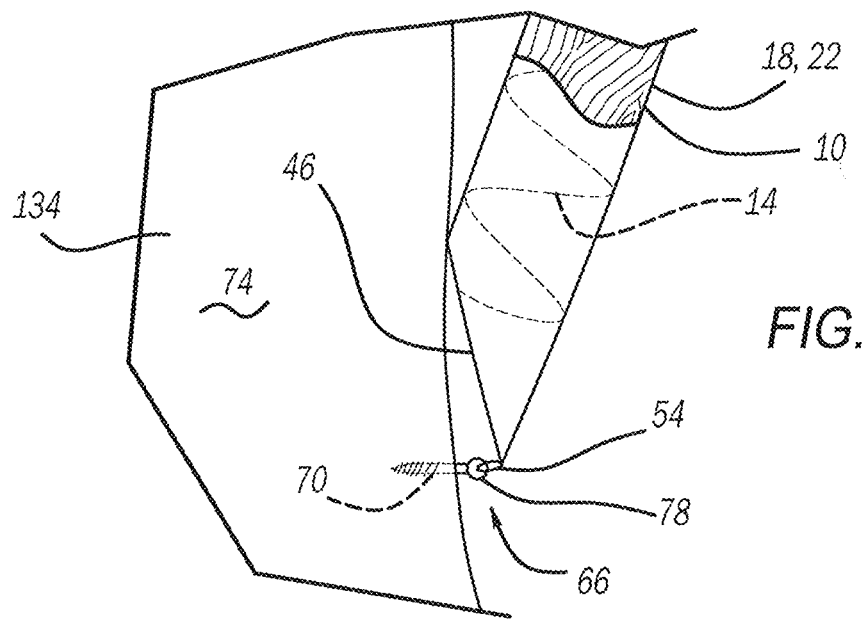
FIG. 10 is a schematic, side view of the lower end of the artificial tree branch attached to the tree via a lag eye bolt.

Referring to FIG. 10, wherein like reference numbers refer to like components 1-4, a tree-engaging apparatus 66 includes a third fastening element 70 engageable with a tree 74 and a fourth fastening element 78 mounted to the third fastening element 70 and engageable with the first fastening element 54. In the embodiment depicted, the third fastening element 70 is a lag bolt or lag screw and the fourth fastening element 78 is an eyelet, i.e., a metal loop integrated with the lag bolt or screw. As understood by those skilled in the art, the carabiner 54 is engageable with the eyelet of the fourth fastening element 78.

FIGS. 5-7 schematically depict an articulating support arm 82. The support arm 82 includes a plurality of links that are pivotably connected to each other. In the embodiment depicted, articulating support arm 82 includes a first link 86A, a second link 86B, a joint 90, a fifth fastening element 94, and a sixth fastening element 98. The joint 90 interconnects the first link 86A and the second link 86B such that the second link 86B is selectively rotatable relative to the first link 86A between first and second positions. The second link 86B is shown in the first position in FIGS. 5-7, and is shown in the second position in phantom in FIG. 7.

The length of the articulating support arm 82 is lower when the second link 86B is in the second position than when the second link is in the first position. As shown in FIG. 7, the length of the arm 82 is reduced by approximately one half by rotating the second link 86B to the second position for efficient storage and transportation of the support arm 82.

The fifth fastening element 94 is mounted to the first link 86A and engageable with the tree as explained below. The sixth fastening element 98 is mounted to the second link 86B and is engageable with the second fastening element 58. In the embodiment depicted, the fifth fastening element 94 is an auger bracket having a tapered, threaded segment 102 configured to bore into the tree 74 and a bracket segment 106 extending perpendicularly from the tapered, threaded segment 102. In the embodiment depicted, the bracket segment 106 is cylindrical. The first link 86A defines a cylindrical aperture 110 into which the bracket segment 106 is insertable.

A first toothed collar 114 is mounted to the first link 86A. A second toothed collar 118 mounted to the bracket segment 106. The first toothed collar 114 and the second toothed collar 118 are positioned such that the teeth of the first toothed collar 114 and the teeth of the second toothed collar 118 contact one another when the bracket segment 106 is sufficiently inserted into the aperture 110. The collars 114, 118 thus function to limit rotation of the first link 86A relative to the auger bracket unless a user lifts the first link 86A to avoid contact between the collars 114, 118.

In the embodiment depicted, the sixth fastening element 98 is a metal eyelet, and the second fastening element 58 is a carabiner engageable with the eyelet of the sixth fastening element 98. The auger bracket 94 is securable to the first link 86A with a holddown cap 119 having a threaded stud 120 that extends through the aperture 110 and into a hole 121 in the top of the bracket segment 106. A holddown cap similar to the one shown at 119 may also be used at the joint 90. Similarly, collars such as the ones shown at 114, 118 may be used at the joint 90 to limit motion of the first and second links 86A, 86B relative to one another once the second link 86B is in its desired position relative to the first link 86A.

The artificial tree branch 10, the tree-engaging apparatus 66, and the support arm 82 form a camouflage system 122 that obscures the view of a tree stand 126 and/or a hunter 130 from game animals. More specifically, the apparatus 66 and the arm 82 each connects a respective end of the artificial branch 10 to a tree in a manner that appears natural to game animals but that obstructs their view of the stand 126 and/or hunter 130.

Figure 8:
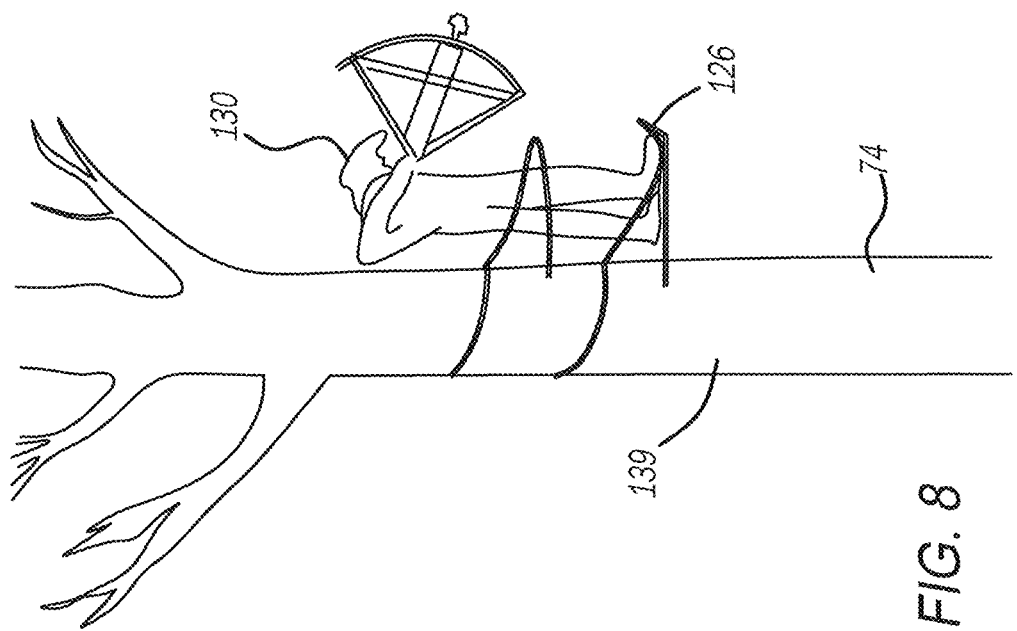
FIG. 8 is a schematic, side view of a tree with which the artificial tree branch of FIG. 1 is usable.

FIGS. 8-11, wherein like reference numbers refer to like components from FIGS. 1-7, schematically a method of attaching the system 122 to the tree 74 for use in providing camouflage. Referring to FIG. 8, the tree 74 is depicted with the tree stand 126 and hunter 130 supported by the tree stand. The tree 74 includes a substantially vertical trunk 134, as understood by those skilled in the art. In FIG. 8, the tree 74 is depicted without the camouflage system 122 and the tree stand 126 and the hunter 130 are exposed and visible to a game animal.

Figure 9:
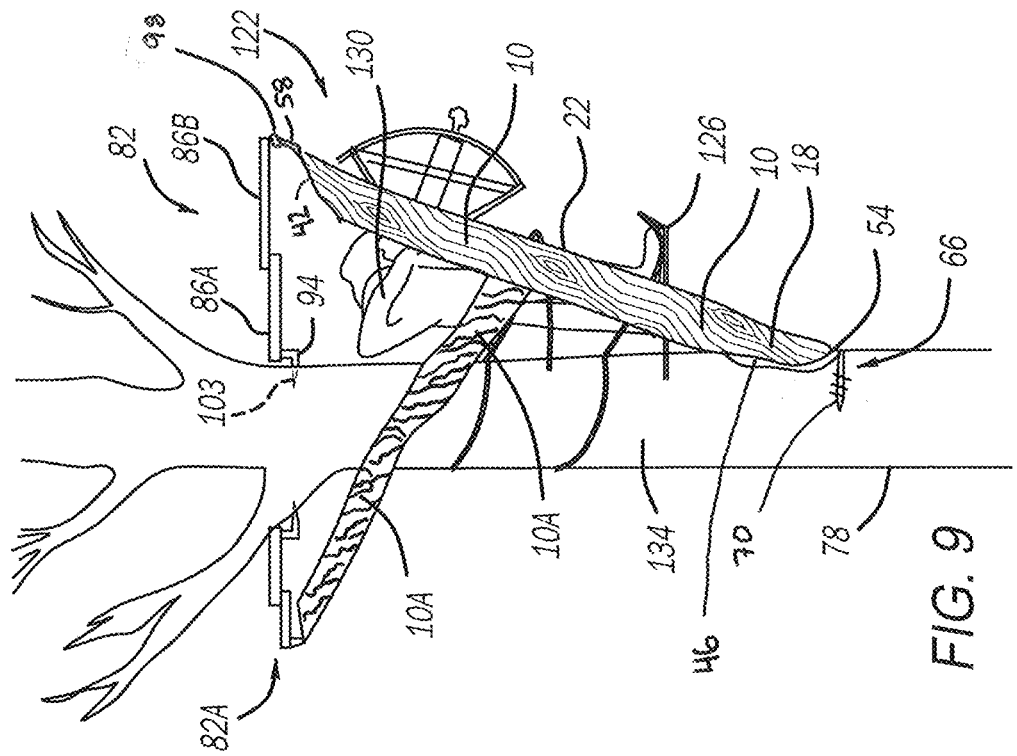
FIG. 9 is a schematic, side view of the tree of FIG. 8 with the artificial tree branch of FIG. 1 attached thereto with the articulating support arm of FIG. 5.

Referring to FIG. 9, a method of using the system 122 includes transporting the camouflage system 122 to the tree 74 and engaging the third fastening element 70 with the tree 74 such that the tree-engaging apparatus 66 is mounted to the tree 74. Referring to FIGS. 9 and 10, engaging the third fastening element 70 with the tree 74 includes rotating the third fastening element against the tree 74 while supplying sufficient force so that the third fastening element 70 penetrates the surface of the trunk 134.

Figure 11:
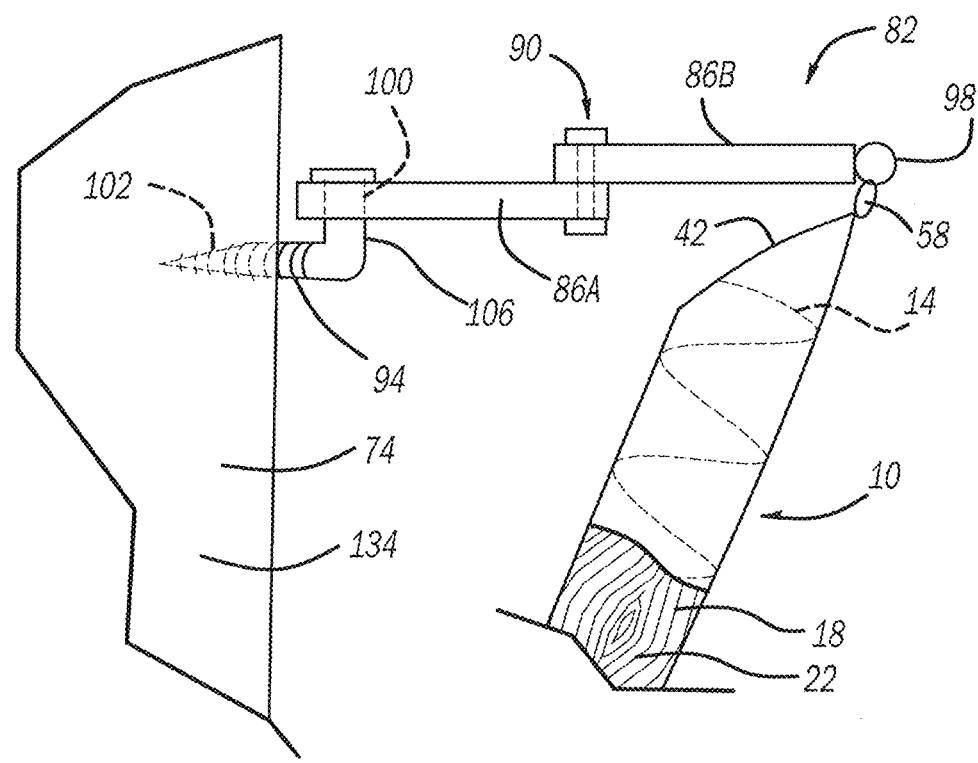
FIG. 11 is a schematic, side view of the upper end of the artificial tree branch attached to the tree via the articulating support arm.

Referring to FIGS. 9 and 11, the method may further include engaging the fifth fastening element 94 with the trunk 134 at a height above the third fastening element 70 such that the articulating support arm is mountable to the tree 74. In the embodiment depicted, the fifth fastening element 94 is engaged with the tree by rotating the tapered, threaded segment 102 against the tree 74 while supplying sufficient force so that the segment 102 penetrates the surface of the trunk 134.

When the arm 82 is transported to the tree, the second link 86B is in the second position to facilitate transportation. The arm 82 is moved so that the bracket segment 106 extends into the aperture 110 and the teeth of the first toothed collar 114 contact the teeth of the second toothed collar 118. The second link 86B is then rotated from the second position to the first position to lengthen the articulating support arm 82.

When the artificial tree branch 10 is transported to the tree 74, the coil spring 14 is in the compressed state so that the cover 18 is collapsed to facilitate transportation. The method includes releasing the coil spring 14 from the compressed state to the unstressed state, thereby causing the cover 18 to change from the collapsed state, as shown in FIG. 4, to the expanded shape.

The method further includes engaging the first fastening element 54 with the fourth fastening element 78, thereby connecting the artificial branch 10 to the tree 74 via the tree-engaging apparatus 66. The method also includes engaging the second fastening element 58 with the sixth fastening element 98 thereby connecting the artificial branch 10 to the tree 74 via the articulating support arm 82.

As shown in FIG. 9, the artificial branch 10 extends from the trunk 134 upward and outward to resemble a natural tree branch. The branch 10 extends from below the platform of the tree stand 126 to above the platform of the tree stand 126. Camouflaging material (not shown) may be added to the articulating support arm 86 to maintain a natural appearance.

The camouflage system 122 may also include yet another artificial tree branch 10A that is substantially identical to branch 10. More specifically, branch 10A includes all of same components of the branch 10, but may vary in size or shape from branch 10. For example, coil spring and cover of branch 10A may have a smaller diameter than branch 10, or may have a smaller maximum length, or may be more frusto-conical. However, branch 10A is still compressible and expandable, has fastening elements similar to or identical to fastening elements 54, 58, and has an external surface with a tree-bark pattern printed thereon or otherwise applied thereto.

The camouflage system 122 may also include yet another articulating support arm 82A, which is substantially identical to the support arm 82. The method may include attaching the articulating support arm 82A to the tree trunk 134 above the articulating support arm 82. Attaching arm 82A is performed in a similar manner to the attachment of arm 82. The method then includes attaching the artificial tree branch 10A to the second articulating support arm 82A in a similar manner to the attachment of the branch 10 to arm 82.

The artificial tree branch 10A is then connected to the coil spring 14 of the artificial tree branch 10 so that the artificial tree branch 10A extends between the artificial tree branch 10 and the second articulating support arm 82, and thus appears to be growing from branch 10. In the embodiment depicted, the artificial tree branch 10A is connected to the coil spring 14 of the artificial tree branch 10 by extending the carabiner of branch 10A into one of the plurality of holes 62 in the flexible fabric cover 18 of branch 10 and clipping the coil spring 14 of branch 10 with the carabiner of branch 10A.

It should be noted that any fastening elements that perform the same or equivalent functions as the fastening elements disclosed herein may be employed within the scope of the claimed invention. Furthermore, in an alternative embodiment (not shown), the links 86A, 86B are in telescoping engagement with one another (instead of pivotable or rotatable connected to one another) to enable variation in the length of the support arm.

Figures 12, 13:
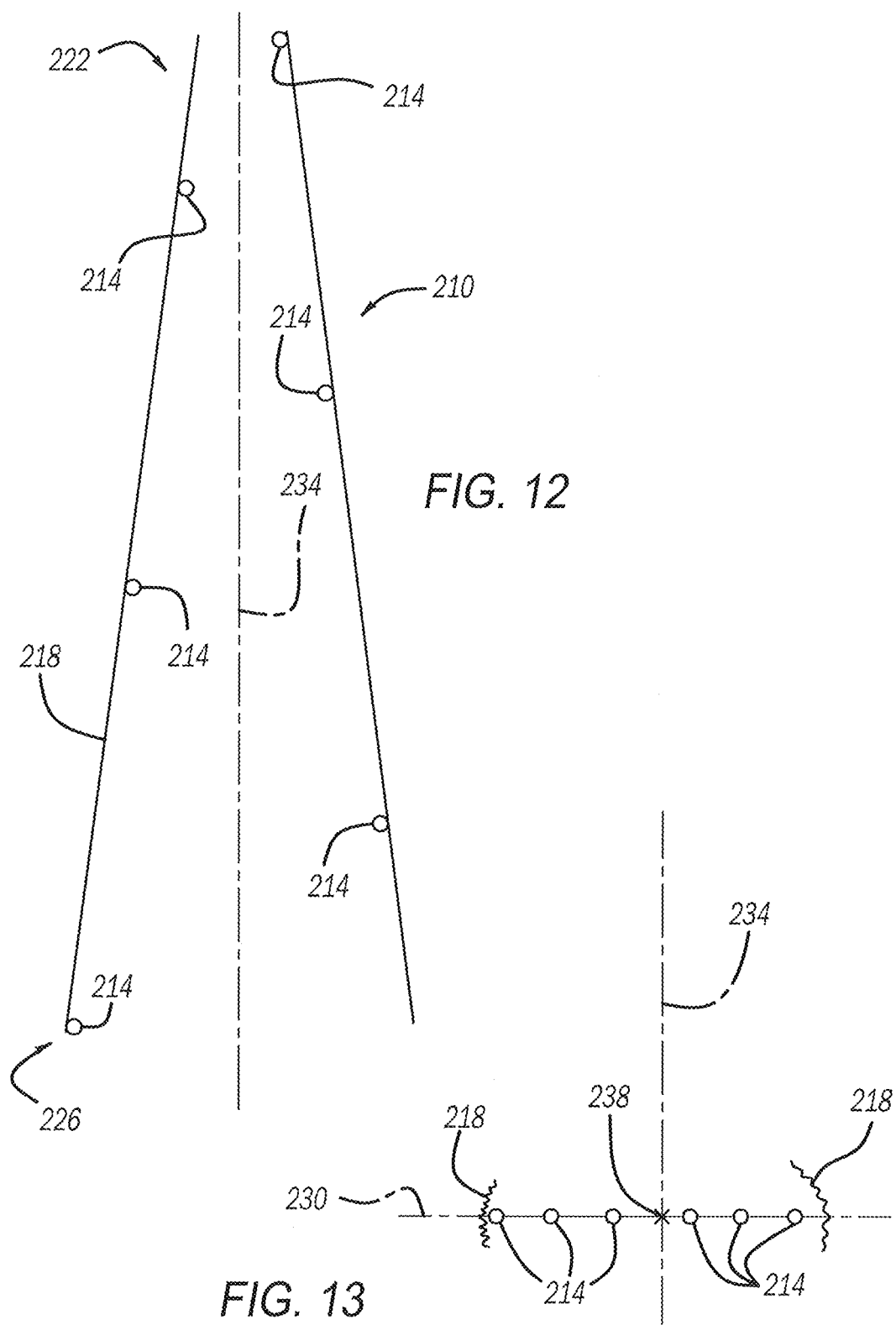
FIG. 12 is a schematic, cross-sectional side view of another artificial tree branch in an expanded shape.
FIG. 13 is a schematic, cross-sectional side view of the artificial tree branch of FIG. 12 in a compressed shape.

FIGS. 12 and 13 depict an artificial tree branch 210 according to an alternative embodiment and within the scope of the claimed invention. Tree branch 210 may be used in place of, or in addition to, branch 10 in the camouflage system 122. Referring to FIGS. 12 and 13, the artificial tree branch 210 is identical to the tree branch 10, except that coil spring 214 is frusto-conical in its unstressed state, as shown in FIG. 12, and the cover 218 is frusto-conical in its expanded state, as shown in FIG. 12. Thus, the cover 218 has a smaller diameter at end 222 than at end 226.

The frusto-conical shape of the spring 214 enables the spring 214 to minimize its length when fully compressed, as shown in FIG. 13, because the coils of the spring 214 are nestable within one another. More specifically, and with reference to FIG. 13, when the spring 214 is compressed, its pitch is reduced to zero so that the coils of the spring 214 are coplanar with each other within a plane 230 that is perpendicular to the spring's axis 234. In other words, the spring 214 in the compressed state forms a segment of a spiral, i.e., a curve on a plane 230 that winds around a center point 238, which is on axis 234, at a continuously increasing distance from the center point 238.

As previously described herein, the springs 14, 214 are elastically compressed (stressed) when in their compact, shortened configurations (as shown in FIGS. 4 and 13), and thus urge the cover 18, 218 toward their expanded configurations. However, it should be noted that, within the scope of the claimed invention, the springs 14, 214 may be unstressed in their compact, shortened configurations. In such an embodiment, the springs 14, 214 would be under tensile stress when in their lengthened configurations (as shown in FIGS. 2 and 12). Thus, in such an embodiment, a user would pull on the cover 18, 218 to expand the cover 18, 218, and the spring 14, 214 would urge the cover 18, 218 toward its collapsed configuration.

While the best modes for carrying out the disclosure have been described in detail, those familiar with the art to which this disclosure relates will recognize various alternative designs and embodiments for practicing the disclosure within the scope of the appended claims.

The invention claimed is:

1. A camouflage system comprising:
   an artificial tree branch including:
     a flexible fabric cover a first end, a second end, and an inner surface defining an enclosed space, the flexible fabric cover having an exterior surface having graphics thereon resembling tree bark,
     a coil spring disposed within the enclosed space and having a selectively variable length, the flexible fabric cover being connected to the coil spring such that the length of the flexible fabric cover varies with the length of the coil spring,
     a first fastening element attached to the first end of the flexible fabric cover;
     a second fastening element attached to the second end of the flexible fabric cover;
   a tree-engaging apparatus engageable with both the first fastening element and a tree to attach the flexible fabric cover to the tree-engaging apparatus;
   a support arm;
   a first support arm fastening element mounted to the support arm, the first support arm fastening element being engageable with the tree to attach the support arm to the tree; and
   a second support arm fastening element mounted to the support arm, the second support arm fastening element being engageable with the second fastening element to attach the flexible fabric cover to the support arm.

2. The camouflage system of claim 1, wherein the flexible fabric cover defines a plurality of holes positioned such that the coil spring contacts the inner surface at an edge of each hole such that a segment of the coil spring extends across each hole.

3. The camouflage system of claim 2, wherein the tree-engaging apparatus has a third fastening element and a fourth fastening element mounted to the third fastening element,
  wherein the third fastening element is engageable with the tree to attach the tree-engaging apparatus to the tree, and
  wherein the fourth fastening element is engageable with the first fastening element to attach the flexible fabric cover to the tree-engaging apparatus.

4. The camouflage system of claim 1, wherein a length of the support arm is selectively variable.

5. The camouflage system of claim 1, wherein the support arm includes a first link, a second link, and a joint,
  wherein the joint interconnects the first link and the second link such that the second link is selectively rotatable relative to the first link between first and second positions,
  wherein the first support arm fastening element is mounted to the first link, and
  wherein the second support arm fastening element is mounted to the second link.

6. The camouflage system of claim 5, wherein the first support arm fastening element is an auger bracket having a tapered, threaded segment configured to bore into the tree and a bracket segment extending perpendicularly from the tapered, threaded segment,
  wherein the first link defines an aperture, and
  wherein the bracket segment is insertable into the aperture.

7. The camouflage system of claim 6, further comprising:
  a first toothed collar mounted to the first link; and
  a second toothed collar mounted to the bracket segment,
  wherein the first toothed collar and the second toothed collar are positioned such that the teeth of the first toothed collar and the teeth of the second toothed collar contact one another when the bracket segment is inserted into the aperture.

8. The camouflage system of claim 7, further comprising:
  another artificial tree branch having a seventh fastener engageable with the coil spring through one of a plurality of holes in the flexible fabric cover.

9. The camouflage system of claim 1, wherein the flexible fabric cover is cylindrical, conical, or frusto-conical, and
  wherein the coil spring is cylindrical, conical, or frusto-conical.

10. The camouflage system of claim 1, wherein the coil spring is movable between a compact configuration and an extended configuration,
  wherein the coil spring is frustoconical in the extended configuration, and
  wherein a pitch of the coil spring is zero and the coil spring is coplanar within a plane that is perpendicular to a central axis of the coil spring when the coil spring is in the compact configuration.

11. The camouflage system of claim 1, wherein the support arm is configured to attach the flexible fabric cover to the tree such that the artificial tree branch is oriented at an angle relative to a trunk of the tree.

12. A method comprising:
  transporting a camouflage system to a tree, the camouflage system including an artificial tree branch having a flexible fabric cover and a coil spring, the flexible fabric cover having a first end, a second end, and an inner surface defining an enclosed space, the coil spring being disposed within the enclosed space and having a selectively variable length, the flexible fabric cover being connected to the coil spring such that the length of the flexible fabric cover varies with the length of the coil spring, the flexible fabric cover having an exterior surface having graphics thereon resembling tree bark, the camouflage system further including a first fastening element attached to the first end, a second fastening element attached to the second end, a tree-engaging apparatus engageable with both the first fastening element and the tree to attach the flexible fabric cover to the tree-engaging apparatus, a support arm, a first support arm fastening element mounted to the support arm, and a second support arm fastening element mounted to the support arm, the first support arm fastening element being engageable with the tree to attach the support arm to the tree, and the second support arm fastening element being engageable with the second fastening element to attach the flexible fabric cover to the support arm.

13. The method of claim 12, further comprising:
  increasing the length of the coil spring and the flexible fabric cover after the transporting of the camouflage system to the tree.

14. The method of claim 13, wherein the tree-engaging apparatus having a third fastening element and a fourth fastening element mounted to the third fastening element.

15. The method of claim 14, further comprising:
  engaging the third fastening element with the tree such that the tree-engaging apparatus is mounted to the tree;
  engaging the second support arm fastening element with the tree at a height above the third fastening element such that the support arm is mounted to the tree;
  engaging the first fastening element with the fourth fastening element thereby connecting the artificial tree branch to the tree-engaging apparatus; and
  engaging the second fastening element with the second support arm fastening element thereby connecting the artificial tree branch to the support arm and the tree.

16. The method of claim 15, wherein a tree stand platform is mounted to the tree above the tree-engaging apparatus and below the support arm.

17. The method of claim 12, wherein the support arm is configured such that the length of the support arm is selectively variable, and
  wherein the method further comprises:
  increasing the length of the support arm.

18. The method of claim 12, wherein the camouflage system includes a second artificial tree branch having a carabiner,
  wherein the flexible fabric cover defines a plurality of holes positioned such that the coil spring contacts the inner surface at an edge of each hole such that a segment of the coil spring extends across each hole,
  wherein the method further comprises:
  attaching the second artificial tree branch to the coil spring of the artificial tree branch by extending the carabiner into one of the plurality of holes in the flexible fabric cover and clipping the coil spring with the carabiner.

* * * * *